United States Patent

Beauchamp et al.

[11] Patent Number: 5,367,970
[45] Date of Patent: Nov. 29, 1994

[54] CONTROLLABLE CAMBER FIN

[75] Inventors: Charles H. Beauchamp, Jamestown; Laurence M. Dean; Anthony V. Raffa, both of Newport, all of R.I.

[73] Assignee: The United States of America as represented by the Secretary of the Navy, Washington, D.C.

[21] Appl. No.: 127,181

[22] Filed: Sep. 27, 1993

[51] Int. Cl.$^5$ .................................................. B63B 3/38
[52] U.S. Cl. .................................... 114/140; 244/219
[58] Field of Search ............. 114/140, 127, 103, 162; 244/219

[56] References Cited

U.S. PATENT DOCUMENTS

| | | | |
|---|---|---|---|
| 1,890,059 | 12/1932 | Lake | 244/12.5 |
| 4,386,574 | 6/1983 | Riolland | 114/103 |
| 4,757,779 | 7/1988 | Graveline | 114/103 |
| 5,186,420 | 2/1993 | Beauchamp | 244/219 |
| 5,263,429 | 11/1993 | Brinkmann | 114/103 X |

FOREIGN PATENT DOCUMENTS

| | | | |
|---|---|---|---|
| 2119730 | 11/1983 | United Kingdom | 114/103 |
| 1402486 | 6/1988 | U.S.S.R. | 114/103 |

*Primary Examiner*—Sherman Basinger
*Attorney, Agent, or Firm*—Michael J. McGowan; Prithvi C. Lall; Michael F. Oglo

[57] ABSTRACT

In a fluid such as water the direction of a vessel is controlled by a fin having at least one fixed chordwise segment and at least one cantilever mounted movable segment secured to the fixed segment by a backbone or spine spring at the neutral axis, and by differently tensioned control wires that are used to achieve camber variations under the influence of the vessel's control system. An elastomeric skin is supported on stiffeners to maintain the general fin cross section during such camber changes.

8 Claims, 2 Drawing Sheets

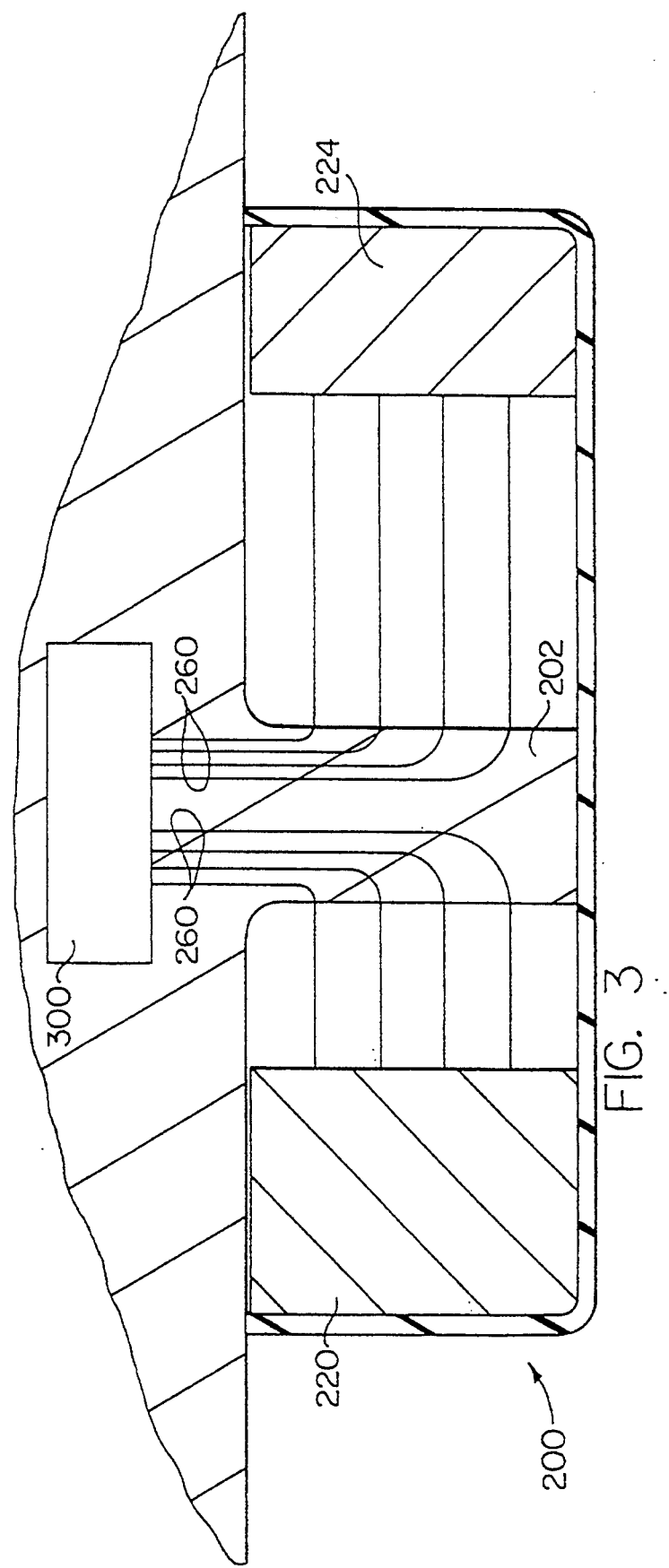

CONTROLLABLE CAMBER FIN

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to variable camber fins for use in a moving fluid to influence that fluids flow over the fin.

(2) Description of the Prior Art

Variable camber airfoil shapes have been utilized since the beginning of aviation to achieve control of an aircraft in flight, and also to achieve an increased amount of lift on the airfoil particularly at low speeds. Such prior art airfoil shapes are shown in the following patents; Gallaudet U.S. Pat. No. 1,219,285; Stupar U.S. Pat. No. 1,220,374; and Antoni et al U.S. Pat. No. 1,317,413. All of these early airfoil designs provide external wires that are tensioned to achieve changes in the camber of a wing. However, all these control wires are provided externally to the airfoil itself. The present invention relates to a variable camber fin particularly well suited for use in an underwater environment where the control wires cannot be provided externally of the foil cross section. Such a requirement is particularly important in the environment of naval operations so as to eliminate the "noise" otherwise created by providing control wires outside a fin on a naval vessel.

Cincotta et al, U.S. Pat. No. 5,114,104, utilizes "shape memory alloy" wires adapted to be contracted an elongated selectively as a result of the application or removal of heat. The wires are provided in the skin surface of the fin itself, which skin is fabricated from an elastomeric material and therefore is readily altered in configuration so as to achieve two distinct foil shapes made possible by these "shape memory alloy" wires. The Cincotta patent is relevant to the present disclosure only insofar as the outer skin of the foil fin is fabricated from an elastomeric material.

Another prior art U.S. Pat. No. 5,150,864 issued to Roglin et al teaches an airfoil camber control system utilizing cables of "shape memory alloy". Again, the configuration for the airfoil is limited by reason of the two alternate states for the shape memory alloy wires. This patent does suggest that the shape can be varied at least spanwise of the airfoil as a result of providing segmented spanwise sections that are each capable of independent manipulation by a computer or the like. The present invention is designed to avoid the need for such complexity.

The prior art generally and the above cited references in particular fail to show or to suggest a workable system for providing the continuous control of the camber of a foil shaped fin achieved simply by altering the tension of wires strategically placed within the airfoil shape.

SUMMARY OF THE INVENTION

It is a general purpose and object of the present invention to provide a fin particularly useful in the marine environment for selectively varying the contour or camber of a fin in such a manner as to enhance the efficiency of the fin as it operates in the flow of fluid over the fins external surface or skin.

It is a further object to provide a variable camber fin for use in a moving fluid such that the fin minimizes flow separation and turbulence and thereby significantly reduces the noise and/or drag created by the fin in the marine environment.

Another object is to provide an improved variable camber fin for use in a moving fluid so as to enhance the control characteristics of underwater vehicles generally. This invention also has particular applicability to the keel of a sailboat, and will permit control of the direction taken by a sailboat equipped with a keel construction in accordance with the present invention solely as a result of altering the foil shape of the keel itself. In an alternative embodiment it is possible to deflect, independently in opposite or the same direction, the leading and trailing edges of such a keel. Thus a flexible controllable camber foil of the present invention permits development of systems for steering a sailboat solely by actuation of leading and trailing edges of the sailboat keel. The system can also be used to camber the keel to resist sideslip or increase the righting moment of keel.

The foregoing objects are accomplished with the present invention by providing a variable camber fin for use in a moving fluid to influence that fluids flow over the fin surface or skin. The invention includes providing a closed foil cross section designed to minimize drag forces on the fin at a particular design equilibrium condition, such as when the fin moves through the fluid at "zero" angle of attack. In such case the fin is preferably symmetrical about the chordwise direction, and has in such symmetrical shape "zero" camber. Camber is defined as that line created by constructing a line connecting the leading and trailing edges of the foil so as to provide an equidistant relationship between one and the opposite surface of the foil outer surface or skin.

The foil shaped fin of the invention has a chordwise cross section that includes at least one fixed foil portion adapted to be secured to other structure, such as the hull of a vessel. The foil fin cross section also includes at least another foil portion that is connected to said fixed foil portion such that these portions cooperate to define a chordwise segment of the closed foil cross section. The latter foil portion has a structure similar to that of a cantilevered beam, the beam having a neutral axis generally oriented in the chordwise direction, and this cantilevered beam foil portion is connected at its root end to the one fixed foil portion mentioned previously. The cantilevered beam foil portion has a free end that is spaced in a chordwise direction from the root end, and internally mounted control wires are provided at least some of which are on one side of the neutral axis of the cantilevered beam while others are provided on the opposite side of the neutral axis. These control wires have ends secured to the cantilevered beam and at its free end, and means is provided for differentially stressing or tensioning some of these control wires relative the others in order to strain the cantilevered beam foil portion and thereby change the camber of the fin. The external surface of the fin is defined by an elastomeric skin so as to permit this flexing of the cantilevered beam foil portion.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 3 is a schematic view illustrating a conventional sailboat hull fitted with a keel constructed in accordance with the present invention.

DESCRIPTION OF THE FIRST EMBODIMENT

Figure 1:
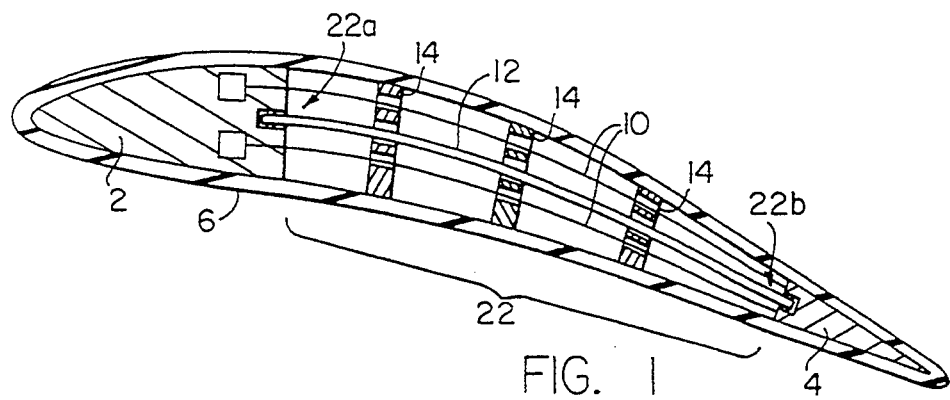
FIG. 1 shows in a chordwise sectional view the construction of a variable camber fin constructed in accordance with the present invention.

Referring now to FIG. 1 there is shown a variable camber fin constructed in accordance with the present invention, and having a fixed leading edge portion 2 that is adapted to be secured to other structure (not shown) such as the hull of a naval vessel or missile, as for example an underwater submersible vehicle or the like. The variable camber fin of FIG. 1 would, when installed on such a vehicle, extend outwardly relative the longitudinal axis of such a vehicle so as to permit the variable camber fin to be manipulated for purposes of controlling the direction taken by the vehicle as it moves through the fluid or water environment.

In addition to the one fixed foil portion referred to above the variable camber fin of FIG. 1 also includes at least another foil portion that is connected to the fixed foil portion such that both portions cooperate to define at least a chordwise segment of the foil cross section. As shown in FIG. 1 this "another" foil portion comprises that portion between the leading edge 2 and the trailing edge portion 4 of the fin cross section. The trailing edge portion 4 of the fin of FIG. 1 is movable only in response to movement of the intermediate "another" portion.

The structure of said "another" foil portion is that of a cantilevered beam having a neutral axis oriented generally in the chordwise direction. See for example FIG. 2 wherein the neutral axis of the variable camber fin in its undeformed or normal configuration is represented by a line 20. Note also that this line 20 also represents the camber of the undeformed fin as well as defining said neutral axis.

Figure 2:
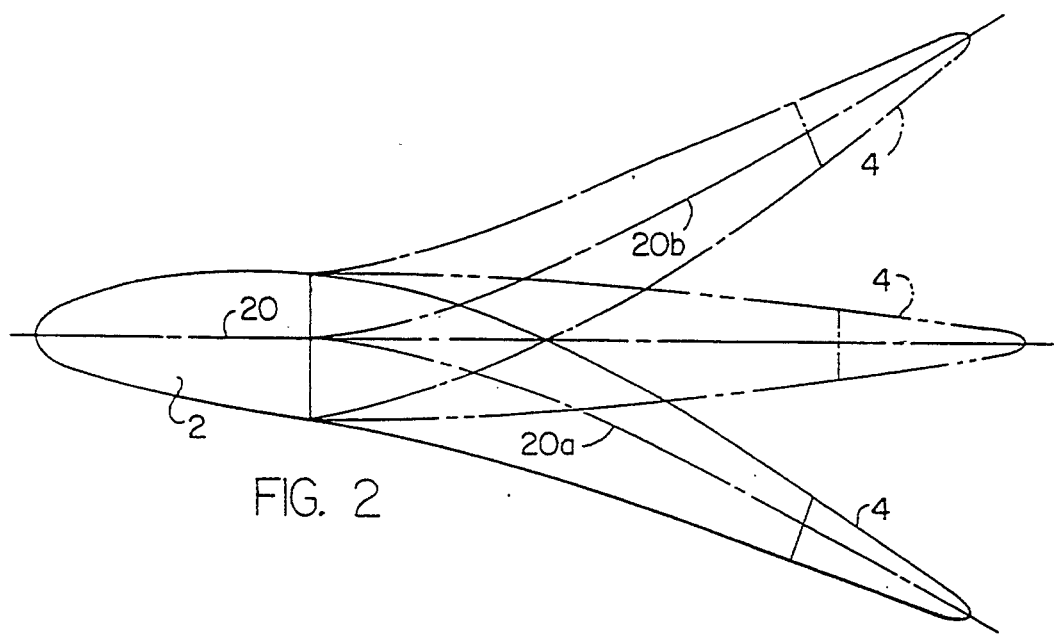
FIG. 2 shows the fin of FIG. 1 in alternative positions made possible as a result of the flexible fin portion that is cantilevered from the fixed fin portion, illustrated in this view as the leading edge portion of the fin.

In accordance with the present invention the variable camber fin of FIGS. 1 and 2 is adapted to be deflected by means to be described so as to assume various positions between the limit positions illustrated in FIG. 2. More particularly FIG. 2 shows in full lines the downward limit position of the variable camber fin with the neutral axis or camber line illustrated at 20a. This view of FIG. 2 also illustrates the variable camber fin in an upward limit position wherein the camber or neutral axis is illustrated generally at 20b. Means to be described achieves various degrees of deflection between these two limit positions of FIG. 2 solely as a result of varying the tension as between the control wires provided in the cantilevered beam foil portion of the fin, as indicated generally at 22 in FIG. 1.

Again with reference to FIG. 1, and referring to the left hand or root end of the cantilevered beam foil portion 22, it is a further feature of the present invention that said root end, indicated 22a, is connected to the leading edge portion 2 so as to permit deflection of the cantilevered beam foil portion 22 in the manner of a cantilevered beam. The free end of the beam 22 is indicated by 22b and it is in turn connected to a trailing edge portion 4. A resilient backbone member 12 is provided at the neutral axis of the cantilevered beam foil portion 22 as suggested generally at 12 in FIG. 1, and this resilient backbone 12 preferably takes the form of a leaf spring that is secured to the fixed foil portion. This element 12 provides a degree of rigidity to the cantilevered portion 22 so that the portion 22 can be deflected or "strained" in bending, but which will act to prevent deflection of this cantilevered beam foil portion in a "shear" mode. With further reference to the cantilevered beam foil portion 22 the outer skin of the fin is defined by an elastomeric material as suggested generally at 6 that provides a skin for the foil, which skin is of variable length so as to provide the desired deflection of the cantilevered foil portion in the manner suggested in FIG. 2. The skin is supported by stiffeners 14 spaced chordwise along the fin between its leading and trailing edges.

It is an important feature of the present invention that control wires 10 are provided between the neutral axis defined by the backbone 12 of the fin and the aforementioned elastomeric skin 6. These wires are loosely received in openings defined by the stiffeners 14. These control wires have ends secured to said free ends of said cantilevered beam foil portion, and more particularly to the trailing edge portion 4. Means is provided for differentially stressing, that is by tensioning, the control wires provided on one side of the neutral axis relative to the control wires provided on the opposite side of the neutral axis of the cantilevered beam foil portion. This tensioning may be accomplished by conventional means (not shown) and is preferably tied into the control system for the vehicle itself so as to permit control of the direction taken by the vehicle in the fluid. Such control system may comprise, for example, a fire control system, or may be manually manipulated by a conventional yoke or control wheel or the like, or may be part of the response generated by an autopilot system.

DETAILED DESCRIPTION OF THE SECOND EMBODIMENT

Figure 4:
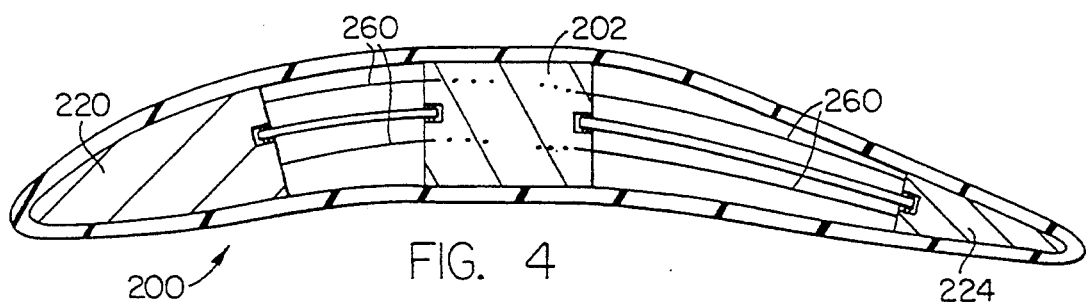
FIG. 4 is a cross section of the keel shown in FIG. 3.

Referring now to FIGS. 3 and 4, a conventional sailboat hull has an attached keel 200 that is designed to have variable camber as described previously with reference to the fin of FIGS. 1 and 2. More particularly, the keel 200 is fitted with a plurality of control wires as indicated generally at 260, 260 provided on opposite sides of a vertical center line or neutral axis that is perpendicular to the horizontally extending longitudinal axis of the hull of the vessel.

Referring now to FIG. 4 in particular, the central portion of the keel 200 is fixed to the underside of the hull, and to this central portion 202 are secured in cantilever fashion two, or first and second, cantilevered beam foil portions. Their root ends are connected to said first mentioned fixed foil portion 202 by wires and by a spine or backbone element. Thus, cantilevered beam foil portions are arranged opposite one another and cooperate with the fixed central portion 202 to define a generally symmetrical keel, at least when the keel is in its non-deflected or undeformed position as referred to previously with respect to the fin of FIG. 2. Thus, the keel can be configured to have a linear chordwise camber.

Both the first and the second cantilevered beam foil portions have internally mounted control wires some of which are provided on one side of their respective neutral axes of these cantilevered beam foil portions. The first mentioned cantilevered beam foil portion 220 comprises the leading edge portion of the keel whereas the second mentioned cantilevered beam foil portion 224 comprises a trailing edge portion of the keel. These cantilevered beam foil portions are identical in structure to the single cantilevered beam portion 22 described previously with reference to FIGS. 1 and 2, albeit that they are oppositely arranged. That is, the free end portions of the two sets of control wires are secured to either the leading edge or the trailing edge of these cantilevered beam portions so that the inboard or root ends of these control wires can be manipulated by conventional means 300 provided internally of the vessel to achieve various deflection modes one of which is illustrated in FIG. 4. Another deflection mode might be the mirror image of the view in FIG. 4. Other deflection modes can be envisioned such that these cantilevered beam foil portions are deflected in opposite directions so that the trailing or second cantilevered beam foil portion is arranged opposite the leading edge or first portion.

Obviously many modifications and variations of the present invention will become apparent in light of the above teachings. For example, one might provide in addition to a single fixed spine 202 for the keel of FIGS. 3 and 4 a two or multi-part spine having hinged joints to further enhance the degree of deflection that can be accommodated in a typical fluid flow without unnecessary disruption of the flow and without creation of the undesirable turbulence and other effects as referred to previously that tend to inhibit the use of wire controlled foils generally. Additionally, the variable camber fin of the present invention might also include not only the relatively rigid leading edge and trailing edge portions as shown in both the first and second embodiments, but might also include means for defining the deflections of these portions of the fin, as for example by the placement of control elements within these leading and trailing edges, which control elements are movably mounted in the adjacent hull of the vessel to which the fin is attached in order to limit and to stabilize the deflections achieved by a plurality of cantilevered beam foil portions connected cantilever fashion to one or more of such articulated but controllable "fixed" foil portions that serve to secure the fin to the vessel or hull.

In light of the above, it is therefore understood that within the scope of the appended claims, the invention may be practiced otherwise than as specifically described.

What is claimed is:

1. A variable camber fin for use in a moving fluid to influence that fluid's flow over the fin, said fin comprising:
    a closed foil cross section designed to minimize the drag forces on the fin at certain design equilibrium conditions;
    said foil fin having a cross section that includes at least one fixed foil portion adapted to be secured to other structure;
    said foil fin cross section also including at least another foil portion that is connected to said one fixed foil portion such that the said one and another portions cooperate to define a chordwise segment of said closed foil cross section;
    said another foil portion having the structure of a cantilevered beam with a neutral axis generally oriented in said chordwise direction, and a resilient structural element oriented at said neutral axis;
    said resilient structural element having a root end secured to said one fixed foil portion and said resilient structural element having a free end spaced in said chordwise direction from said root end thereof;
    said cantilevered beam foil portion having internally mounted control wires some of which are provided on one side of said resilient structural element and other control wires provided on the opposite side of said resilient structural element, said control wires having free ends, said free ends secured to said free end of said resilient structural element, said control wires having root ends secured to said fixed foil portion in spaced relation to said resilient structural element root end; and
    means for differentially stressing some of said control wires relative said other control wires to bend said resilient structural element and thereby to change the camber of the fin.

2. The variable camber fin of claim 1 further characterized by a third foil portion connected to said free end of said resilient structural element and to said free ends of said control wires.

3. The variable camber fin of claim 1 further characterized by an outer skin for said cantilevered portion of said closed foil cross section, said outer skin being of flexible elastomeric material, and internal stiffeners to maintain generally said flexible outer skin cross section as said control wires are differentially stressed to change the camber of the fin said stiffeners having openings for loosely receiving said control wires.

4. The variable camber fin of claim 1 further characterized by a second cantilevered beam foil portion having a root end connected to said one fixed foil portion and arranged opposite said first mentioned cantilevered beam foil portion in said chordwise direction, said second cantilevered beam foil portion also having internally mounted control wires some of which are provided on one side of a second resilient structural element located on a second neutral axis associated with said second cantilevered beam foil portion.

5. The variable camber fin of claim 4 further characterized by other control wires provided on an opposite side of said second resilient structural element at said second neutral axis, and said other control wires of said second cantilevered beam foil portion having root ends, said root ends secured to said second structural element, said second structural element having a free end, and said other control wires having free ends secured to said free end of said second resilient structural element.

6. The variable camber fin of claim 5 further characterized by an outer skin for said second cantilevered portion of said closed foil cross section, said outer skin being of flexible elastomeric material, and internal stiffeners to maintain generally and flexible outer skin cross section as said control wires are differentially stressed to change the camber of the fin, said stiffeners having openings for loosely receiving said control wires.

7. The variable camber fin of claim 4 further characterized by leading and trailing edge foil portions connected respectively to said free ends of said first mentioned and second cantilevered resilient structural elements.

8. The variable camber fin of claim 7 further characterized by an outer skin for said second cantilevered portion of said closed foil cross section, said outer skin being of flexible elastomeric material, and internal stiffeners to maintain generally said flexible outer skin cross section as said control wires are differentially stressed to change the camber of the fin, said stiffeners having openings for loosely receiving said control wires.

* * * * *